United States Patent
Wang et al.

(10) Patent No.: US 11,693,088 B2
(45) Date of Patent: Jul. 4, 2023

(54) METHOD AND DEVICE FOR SEPARATING ECHO SIGNALS OF SPACE-TIME WAVEFORM ENCODING SYNTHETIC APERTURE RADAR IN ELEVATION

(71) Applicant: Institute of Electronics, Chinese Academy of Sciences, Beijing (CN)

(72) Inventors: Yu Wang, Beijing (CN); Qingchao Zhao, Beijing (CN); Yi Zhang, Beijing (CN); Wei Wang, Beijing (CN); Yunkai Deng, Beijing (CN); Weidong Yu, Beijing (CN); Yashi Zhou, Beijing (CN)

(73) Assignee: Institute of Electronics, Chinese Academy of Sciences, Beijing (CN)

( * ) Notice: Subject to any disclaimer, the term of this patent is extended or adjusted under 35 U.S.C. 154(b) by 323 days.

(21) Appl. No.: 17/000,394

(22) Filed: Aug. 24, 2020

(65) Prior Publication Data

US 2021/0132188 A1   May 6, 2021

(30) Foreign Application Priority Data

Nov. 5, 2019  (CN) .......................... 201911073004.1

(51) Int. Cl.
*G01S 7/292* (2006.01)
*G01S 7/40* (2006.01)
(Continued)

(52) U.S. Cl.
CPC ............ *G01S 7/292* (2013.01); *G01S 7/4026* (2013.01); *G01S 7/414* (2013.01); *G01S 13/90* (2013.01); *G01S 7/4034* (2021.05)

(58) Field of Classification Search
CPC ........ G01S 7/292; G01S 7/4026; G01S 7/414; G01S 13/90; G01S 7/4034; G01S 7/2813;
(Continued)

(56) References Cited

U.S. PATENT DOCUMENTS

2020/0036487 A1* 1/2020 Hammond ............ H04L 5/0012
2021/0088651 A1* 3/2021 Neto ....................... G01S 13/90

FOREIGN PATENT DOCUMENTS

CN    103760526 A    4/2014
CN    103869313 A    6/2014
(Continued)

OTHER PUBLICATIONS

Hongbo Mo, Wei Xu, Zhimin Zeng, "Investigation on Beamspace Multiple-Input Multiple-Output Synthetic Aperture Radar Data Imaging", International Journal of Antennas and Propagation, vol. 2016, Article ID 2706836, 14 pages, 2016. https://doi.org/10.1155/2016/2706836 (Year: 2016).*

(Continued)

*Primary Examiner* — Erin F Heard
*Assistant Examiner* — Juliana Cross
(74) *Attorney, Agent, or Firm* — Syncoda LLC; Feng Ma

(57) ABSTRACT

A method and a device for separating echo signals of STWE SAR in elevation are provided. The method includes that: aliasing echo signals of multiple sub-swaths are received; for a target sub-swath of the multiple sub-swaths, multiple sub-beams associated with the target sub-swath are generated, the multiple sub-beams pointing to different directions of the target sub-swath respectively, and a null of each of the multiple sub-beams being used for deep nulling suppression on echo signals of sub-swaths except the target sub-swath; and the aliasing echo signals are processed based on the multiple sub-beams and multiple nulls corresponding to the multiple sub-beams to generate a target echo signal of the target sub-swath.

17 Claims, 9 Drawing Sheets

(51) Int. Cl.
  *G01S 7/41* (2006.01)
  *G01S 13/90* (2006.01)
(58) Field of Classification Search
  CPC ........ G01S 13/9056; G01S 7/354; G01S 7/41;
       G01S 13/4463; G01S 7/4065; G01S 13/426
  See application file for complete search history.

(56) References Cited

FOREIGN PATENT DOCUMENTS

| | | |
|---|---|---|
| CN | 103885052 A | 6/2014 |
| CN | 110333507 A | 10/2019 |

OTHER PUBLICATIONS

Hongbo Mo et al: "Investigation on Beamspace Multiple-Input Multiple-Output Synthetic Aperture Radar Data Imaging", International Journal of Antennas and Propagation, vol. 2016, Feb. 25, 2016 (Feb. 25, 2016), pp. 1-14, XP055771138, ISSN: 1687-5869, D01: 10.1155/2016/2706836 sec. 2, 3.1; figures 1b,6.

Fan Feng et al: "Echo Separation in Multidimensional Waveform Encoding SAR Remote Sensing Using an Advanced Null-Steering Beamformer", IEEE Transactions on Geoscience and Remote Sensing, IEEE Service Center, Piscataway, NJ, US, vol. 50, No. 10, Oct. 1, 2012 (Oct. 1, 2012), pp. 4157-4172, XP011463653, ISSN: 0196-2892, DOI: 10.1109/TGRS.2012.2187905 sec. III, IV.

Fan Feng et al: "Study on the Processing Scheme for Space-Time Waveform Encoding SAR System Based on Two-Dimensional Digital Beamfomning", IEEE Transactions on Geoscience and Remote Sensing, vol. 50, No. 3, Mar. 1, 2012 (Mar. 1, 2012), pp. 910-932, XP055770740, US ISSN: 0196-2892, DOI: 10.1109/TGRS.2011.2162097 sec. II, III.

Gerhard Krieger et al: "Multidimensional Waveform Encoding: A New Digital Beamforming Technique for Synthetic Aperture Radar Remote Sensing", IEEE Transactions on Geoscience and Remote Sensing, vol. 46, No. 1, Jan. 1, 2008 (Jan. 1, 2008), pp. 31-46, XP055552078, US ISSN: 0196-2892. DOI: 10.1109/TGRS.2007.905974 sec. IV.

European Search Report in the European application No. 20192094.9, dated Feb. 12, 2021.

Han Xiao dong et al; "Nadir and Range Ambiguity Suppression Based on Real-time Digital Beam Framing in Spaceborne SAR", Journal of Electronics & Information Technology, vol. 35 No. 12, Dec. 31, 2013, entire document.

Feng Fan et al; "An Improved Approach to Separating Echoes in Multidimensional Waveform Encoding Fully-polarimetric SAR", Journal of Electronics & Information Technology, vol. 34 No. 1, Jan. 31, 2012, entire document.

Marwan Younis et al; "On the Pulse Extension Loss in Digital Beamforming SAR", IEEE Geoscience and Remote Sensing Letters, vol. 12 No. 7, Jul. 31, 2015, entire document.

First Office Action of the Chinese application No. 201911073004.1, dated Mar. 31, 2021.

\* cited by examiner

METHOD AND DEVICE FOR SEPARATING ECHO SIGNALS OF SPACE-TIME WAVEFORM ENCODING SYNTHETIC APERTURE RADAR IN ELEVATION

CROSS-REFERENCE TO RELATED APPLICATIONS

This application is based upon and claims priority to Chinese Patent Application No. CN 201911073004.1, filed on Nov. 5, 2019, the entire contents of which are incorporated herein by reference.

BACKGROUND

Spaceborne SAR refers to an SAR on a satellite. With adoption of a microwave imaging technology, a spaceborne SAR may implement all-time and all-weather observation, and is an important earth observation method. According to an application requirement, a spaceborne SAR is required to implement high-resolution wide-swath imaging and simultaneously reduce a length of an echo window to more conveniently implement system design and effectively reduce a data volume required to be sampled and stored onboard. STWE SAR in elevation is a novel effective working mode, and a system working principle thereof is shown in FIG. 1 (for example, for two sub-swaths). When a signal is transmitted, an antenna irradiates different sub-swaths in series during each pulse repetition time by use of narrow beams with different directions, respectively. A far-end sub-swath is irradiated earlier than a near-end sub-swath. Transmitting timing may be reasonably designed to make echoes of each sub-swath overlap, thereby effectively reducing a length of an echo window, improving system design flexibility, and further effectively reducing a data volume required to be sampled and stored onboard.

An STWE SAR in elevation has obvious advantages in implementation of high-resolution wide-swath imaging. However, since echoes of each sub-swath overlap, it is necessary to separate temporally overlapping echo signals to achieve system performance, and an echo signal separation degree directly influences the system performance.

SUMMARY

The present disclosure relates to the technical field of radars, and particularly to a method and device for separating echo signals of Space-Time Waveform Encoding Synthetic Aperture Radar (STWE SAR) in elevation.

The embodiments of the disclosure provide a method for separating echo signals of STWE SAR in elevation, which may include the following operations.

Aliasing echo signals of multiple sub-swaths are received.

For a target sub-swath of the multiple sub-swaths, multiple sub-beams associated with the target sub-swath are generated. The multiple sub-beams point to different directions of the target sub-swath respectively, and a null of each of the multiple sub-beams is used for deep nulling suppression on echo signals of sub-swaths except the target sub-swath.

The aliasing echo signals are processed based on the multiple sub-beams and multiple nulls corresponding to the multiple sub-beams to generate a target echo signal of the target sub-swath.

The embodiments of the disclosure provide a device for separating echo signal of STWE SAR in elevation, which may include a processor and memory storing instructions for execution by the processor, herein the processor is configured to:

receive aliasing echo signals of multiple sub-swaths;

for a target sub-swath of the multiple sub-swaths, generate multiple sub-beams associated with the target sub-swath. The multiple sub-beams point to different directions of the target sub-swath respectively, and a null of each of the multiple sub-beams is used for deep nulling suppression on echo signals of sub-swaths except the target sub-swath; and process the aliasing echo signals based on the multiple sub-beams and multiple nulls corresponding to the multiple sub-beams to generate a target echo signal of the target sub-swath.

The embodiments of the disclosure provide non-transitory computer-readable storage medium having stored therein computer instructions that when executed by a processor, implement the steps of the method for separating echo signals of Space-Time Waveform Encoding Synthetic Aperture Radar (STWE SAR) in a elevation, which may include the following operations.

Aliasing echo signals of multiple sub-swaths are received.

For a target sub-swath of the multiple sub-swaths, multiple sub-beams associated with the target sub-swath are generated. The multiple sub-beams point to different directions of the target sub-swath respectively, and a null of each of the multiple sub-beams is used for deep nulling suppression on echo signals of sub-swaths except the target sub-swath.

The aliasing echo signals are processed based on the multiple sub-beams and multiple nulls corresponding to the multiple sub-beams to generate a target echo signal of the target sub-swath.

DETAILED DESCRIPTION

In order to make the technical solutions of the embodiments of the disclosure convenient to understand, a related art for the embodiments of the disclosure will be described below.

An STWE SAR in elevation has obvious advantages in implementation of high-resolution wide-swath imaging, but echoes of sub-swaths during work may overlap. The echoes of each sub-swath temporally overlap but are from different directions, namely the overlapping echoes have different spatial viewing angles, and signals are encoded in a space-time domain.

Figure 2:
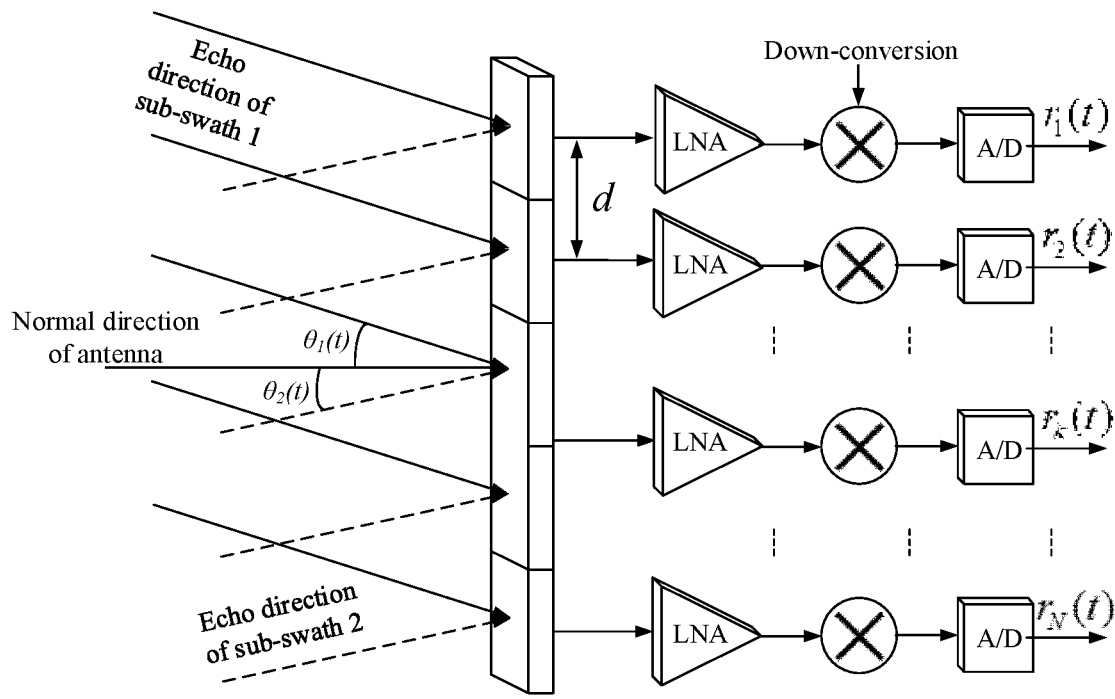
FIG. 2 is a geometric and digital signal receiving flow-chart of receiving an echo by an STWE SAR in elevation through an multichannel antenna in elevation.

A multichannel antenna in elevation is adopted for echo reception, and a geometric and digital signal receiving flow is shown in FIG. 2. Based on different spatial viewing angles of echoes of different sub-swaths, Digital Beam Forming (DBF) technology with null direction has a potential echo separation capability, namely a beam formed by DBF may point to a direction of an echo to be extracted of a sub-swath, and meanwhile, a null is set in a direction of an interference echo of another sub-swath. For example, for two sub-swaths in elevation, the processing method may be expressed as the following formula:

$$\omega_m^H \cdot v_m = N \quad \omega_m^H \cdot v_m = 0 (m \neq n) \quad (1)$$

where $m, n \in [1,2]$, $\omega_m$ represents a DBF weighted vector for extraction of an echo of a sub-swath m, $(\cdot)^H$ represents conjugate transpose, and $v_m$ and $v_n$ represent steering vectors corresponding to m th and n th sub pulses respectively, expressions thereof being:

$$v_m = \left[1, \exp\left\{j\frac{2\pi}{\lambda}d\sin(\theta_m(t))\right\}, \cdots \exp\left\{j\frac{2\pi}{\lambda}(N-1)d\sin(\theta_m(t))\right\}\right]^T \quad (2)$$

$$v_n = \left[1, \exp\left\{j\frac{2\pi}{\lambda}d\sin(\theta_n(t))\right\}, \cdots \exp\left\{j\frac{2\pi}{\lambda}(N-1)d\sin(\theta_n(t))\right\}\right]^T,$$

where $\lambda$ is a carrier wavelength of a transmitting signal, d is an element spacing of a DBF antenna, N is the channel number of the DBF antenna, $\theta_m(t)$ and $\theta_n(t)$ represent antenna normal offset angles in directions of center frequency points of the echoes of the sub-swath m and a sub-swath n at a moment t respectively, and $(\cdot)^T$ represents a transpose operation. A receiving array multi-matrix V is defined as:

$$V = [v_1, v_2] \quad (3).$$

A solution to the formula (1) is obtained by use of an LCMV algorithm:

$$\omega_m^H = N \cdot e_m^T (V^H V)^{-1} \cdot V^H \quad (4),$$

where $e_m^T$ represents a column vector that is 1 for an m th element and 0 for others. Since a transmission pulse has a certain width and may extend to a certain extent on the ground, some problems exist when the weighted vector obtained by the formula (4) is used. First, for an echo to be extracted of a sub-swath, extension loss of pulse received by DBF is not compensated, which may worsen a system signal-to-noise ratio. Second, for an echo to be suppressed of a sub-swath, deep nulling in a center of a pulse ground width may be ensured only, and nulling at another position may not reach a depth required by a system, so that the interference echo may not be effectively suppressed, and echo separation effectiveness is finally influenced.

Performing pulse compression on signals received by each channel before echo separation to concentrate dispersed signal energy may solve the problems of signal-to-noise ratio loss caused by pulse extension and insufficient echo separation degree. However, performing real-time pulse compression on the signal of each channel may greatly increase system complexity, which is unfavorable for onboard real-time processing of echo separation and DBF synthesis.

To this end, the following technical solutions of the embodiments of the disclosure are proposed. In order to make the characteristics and technical contents of the embodiments of the disclosure understood in more detail, implementation of the embodiments of the disclosure will be described below in combination with the drawings in detail. The appended drawings are only adopted for description as references and not intended to limit the embodiments of the disclosure.

Figure 3:
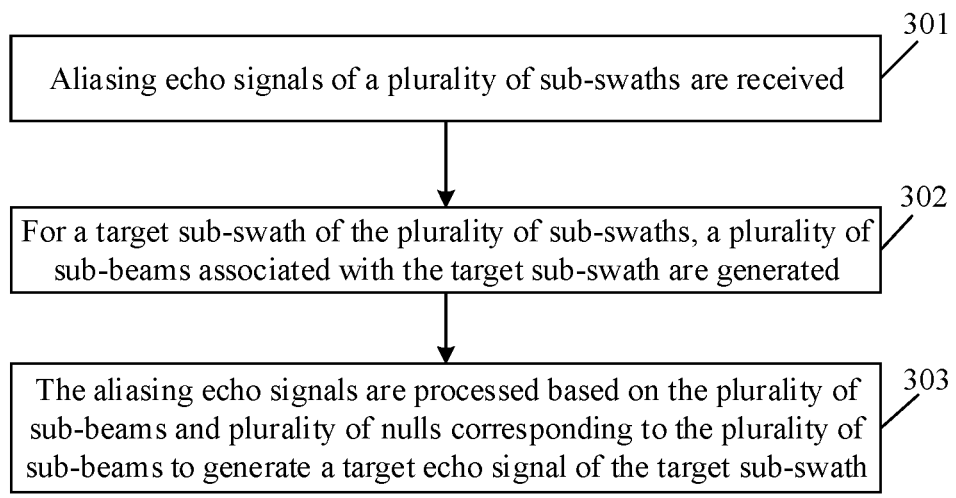
FIG. 3 is a flowchart of a method for separating echo signals of STWE SAR in elevation according to an embodiment of the disclosure.

An embodiment of the disclosure provides a method for separating echo signals of STWE SAR in elevation. FIG. 3 is a flowchart of a method for separating echo signals of STWE SAR in elevation according to an embodiment of the disclosure. As shown in FIG. 3, the method for separating echo signals of STWE SAR in elevation includes the following steps.

In 301, aliasing echo signals of multiple sub-swaths are received.

It is to be noted that, for convenient description, the STWE SAR in elevation is called an SAR for short in the following embodiments.

In an alternative implementation of the disclosure, the SAR receives the aliasing echo signals of the multiple sub-swaths via an multichannel antenna in elevation and then samples and stores the received aliasing echo signals for subsequent echo separation processing and imaging processing.

In 302, for a target sub-swath of the multiple sub-swaths, multiple sub-beams associated with the target sub-swath are generated, the multiple sub-beams pointing to different directions of the target sub-swath respectively, and a null of each of the multiple sub-beams being used for deep nulling suppression on echo signals of sub-swaths except the target sub-swath.

In the embodiment of the disclosure, the SAR adopts a multipath beam former, different weighting coefficients being adopted for each path of the beam former, thereby generating the multiple sub-beams with different directions, and the sub-beams having nulls of different directions.

How to extract the echo signal of the sub-swath will be described below in combination with FIG. 4. It is to be noted that how to extract the echo signal of the sub-swath is described with two sub-swaths (i.e., a sub-swath 1 and a sub-swath 2) in elevation as an example in FIG. 4. The technical solution of the embodiment of the disclosure is not limited to the example involving two sub-swaths and may also be applied to more sub-swaths.

Figure 4:
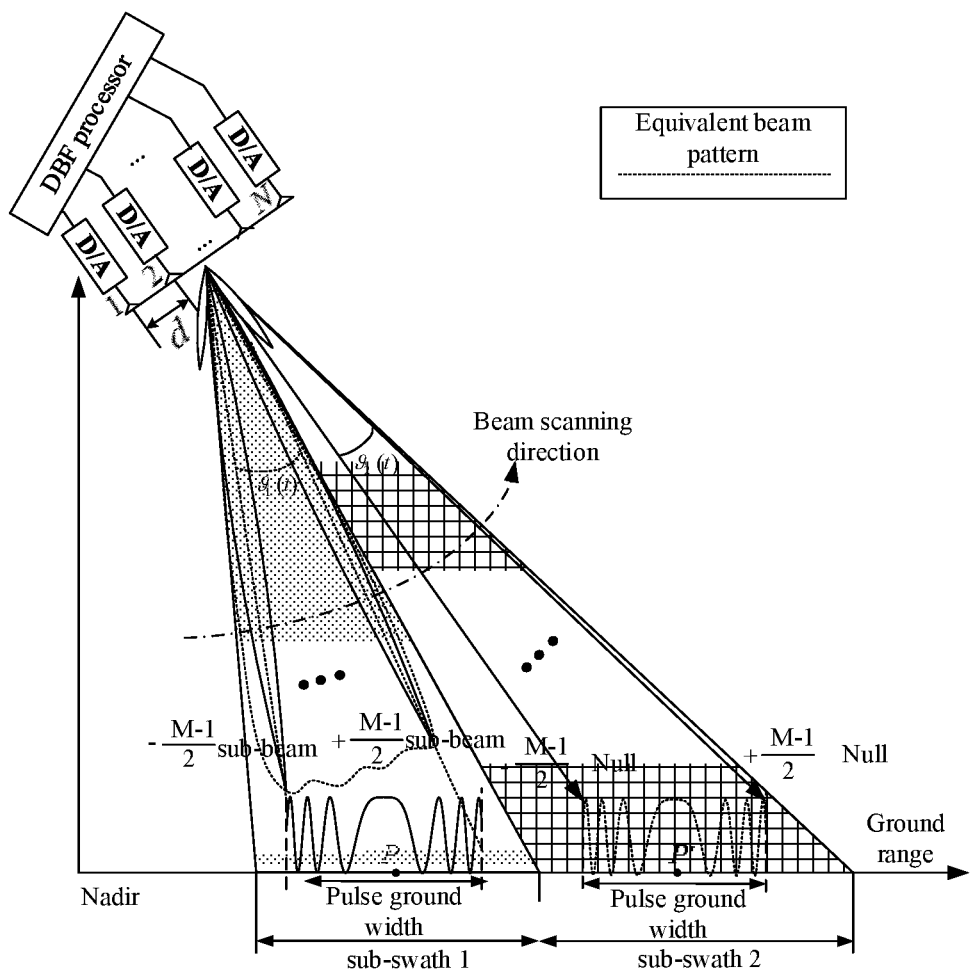
FIG. 4 is a schematic diagram of a working principle for extraction of an echo signal of a sub-swath 1 according to an embodiment of the disclosure.

FIG. 4 is a schematic diagram of a working principle for extraction of an echo signal of a sub-swath 1 according to an embodiment of the disclosure. The sub-swath 2 is an interference sub-swath of the sub-swath 1. As shown in FIG. 4, an angle between edge sub-beams and an angle between edge null directions are $\partial_1(t)$ and $\partial_2(t)$ respectively, and correspond to pulse downward viewing angle widths of the sub-swath 1 and sub-swath 2 respectively. Namely, the SAR cover pulse ground widths of the two sub-swaths with multiple beams and multiple null directions respectively. A pulse downward viewing angle width $\partial_m(t)$ of an m th sub-swath is represented as:

$$\partial_m(t) = \frac{T_p \cdot c}{2 \cdot R_{se} \cdot \left(\frac{R_{se} \cdot \cos\Theta_m(t)}{\sqrt{R_e^2 - (R_{se} \cdot \sin\Theta_m(t))^2}} - 1\right) \cdot \sin\Theta_m(t)}, \quad (5)$$

where t is range time, $T_p$ is a width for transmitting pulse, c is a propagation velocity of electromagnetic wave, $R_e$ is the earth radius, $R_{se}$ is a loaded orbit radius, and $\Theta_m(t)$ is a downward viewing angle in a direction of a center frequency point of an echo of the m th sub-swath at the moment t.

In the embodiment of the disclosure, an angle between two adjacent sub-beams of the multiple sub-beams is $$\Delta\partial_m(t) = \frac{\partial_m(t)}{M},$$

where $\partial_m(t)$ is a pulse downward viewing angle width of the target sub-swath, and M is the number of the multiple sub-beams.

In the embodiment of the disclosure, the multiple sub-beams correspond to the multiple nulls, and an angle between two adjacent nulls of the multiple nulls is $$\Delta\partial_m(t) = \frac{\partial_m(t)}{M},$$

where $\partial_n(t)$ is a pulse downward viewing angle width of the sub-swaths except the target sub-swath, and M is the number of the multiple sub-beams.

According to a geometric receiving relationship shown in FIG. 4, steering vectors of the ith $$\left(i = -\frac{M-1}{2}, -\frac{M-1}{2}+1, \ldots + \frac{M-1}{2},\right.$$

M is the number of the sub-beams and M is valued to cut the pulse downward viewing angle width to be less than a 3 dB main lobe width of the sub-beam) sub-beam for the echoes from the two sub-swaths is defined as:

$$v_{i1} = \left[1, \exp\left\{j2\pi\frac{d \cdot \sin(\theta_1(t) + i \cdot \Delta\vartheta_1(t))}{\lambda}\right\}, \cdots, \exp\left\{j2\pi\frac{(N-1)d \cdot \sin(\theta_1(t) + i \cdot \Delta\vartheta_1(t))}{\lambda}\right\}\right]^T \quad (6)$$

and $$v_{i2} = \left[1, \exp\left\{j2\pi\frac{d \cdot \sin(\theta_2(t) + i \cdot \Delta\vartheta_2(t))}{\lambda}\right\}, \cdots, \exp\left\{j2\pi\frac{(N-1)d \cdot \sin(\theta_2(t) + i \cdot \Delta\vartheta_2(t))}{\lambda}\right\}\right]^T, \quad (7)$$

where $$\Delta\vartheta_1(t) = \frac{\vartheta_1(t)}{M}, \Delta\vartheta_2(t) = \frac{\vartheta_2(t)}{M},$$

d is an element spacing of antenna, N is the number of channel, $\lambda$ is a carrier wavelength, $(\cdot)^T$ represents a transpose operation, and $\theta_1(t)$ and $\theta_2(t)$ represent antenna normal offset angles in directions of center frequency points of the echoes of the sub-swaths 1 and 2 at a moment t respectively. Furthermore, a receiving array multi-matrix $V_i = [v_{i1}, v_{i2}]$ of the i th sub-beam may be defined, and a weighted vector, used to extract an echo of the sub-swath m and suppress echoes of the other sub-swaths, of the i th path of the beam former is calculated as follows:

$$\omega_{im}^H = N \cdot e_m^T (V_i^H V_i)^{-1} \cdot V_i^H \quad (8)$$

The multiple sub-beams generated by the multipath beam former with different weighting coefficients and the multiple null directions cut the pulse ground widths of the two sub-swaths into multiple segments, and the pulse downward viewing angle width after cutting is less than the 3 dB main lobe width of each sub-beam, so that influence brought by pulse extension (including the problem of pulse extension loss of a signal to be extracted and the problem of insufficient nulling depth of a signal to be suppressed) may be effectively reduced.

In 303, the aliasing echo signals are processed based on the multiple sub-beams and multiple nulls corresponding to the multiple sub-beams to generate a target echo signal of the target sub-swath.

Herein, 303 further includes the following steps.

In 303a, for each of the multiple sub-beams, a partial echo signal of the target sub-swath is extracted from the aliasing echo signals by use of the sub-beam, and deep nulling suppression is performed on the echo signal of the sub-swaths except the target sub-swath by use of the null of the sub-beam.

In the embodiment of the disclosure, the multiple sub-beams are generated by a multipath beam former, an i th path in the multipath beam former being used to extract the partial echo signal of the target sub-swath, and a weighted vector for deep nulling suppression on the echo signal of the sub-swaths except the target sub-swath is:

$$\omega_{im}^H = N \cdot e_m^T (V_i^H V_i)^{-1} \cdot V_i^H \quad (9),$$

where $$i = -\frac{M-1}{2}, -\frac{M-1}{2}+1, \ldots + \frac{M-1}{2},$$

i is a serial number of the sub-beam, the minus represents that the generated sub-beam is on a left side of a central sub-beam, the plus represents that the generated sub-beam is on a right side of the central sub-beam, M is the number of the multiple sub-beams, $e^m$ is a column vector that is 1 for an m th element and 0 for others, and $V_i$ is a receiving array multi-matrix of the i th sub-beam.

In 303b, multiple partial echo signals of the target sub-swath are extracted from the aliasing echo signals by use of the multiple sub-beams.

In the embodiment of the disclosure, extraction of the partial echo signal of the target sub-swath from the aliasing echo signals by use of each sub-beam is equivalent to extraction of the multiple partial echo signals of the target sub-swath from the aliasing echo signals by use of the multiple sub-beams.

In 303c, the multiple partial echo signals are filtered, and the multiple filtered partial echo signals are synthesized to obtain the target echo signal of the target sub-swath.

In the embodiment of the disclosure, for a partial echo signal corresponding to the i th sub-beam, the partial echo signal is filtered according to the following band range of:

$$\left[-\frac{2 \cdot i+1}{2 \cdot M} \cdot B_r, -\frac{2 \cdot i-1}{2 \cdot M} \cdot B_r\right], \quad (10)$$

where $B_r$ is a bandwidth for transmitting signals, and M is the number of the multiple sub-beams.

In an alternative implementation of the disclosure, the extracted partial echo signal of the target sub-swath is filtered by use of a Band-Pass Filter (BPF) to obtain a high-gain narrow-band signal corresponding to the sub-beam. For the echo signal to be extracted, high-gain reception of the signal may be ensured in this narrow-band, thereby alleviating the pulse extension loss. For the echo signal to be suppressed, deep nulling of the interference signal may be ensured in this narrow-band, thereby ensuring effective suppression on the interference signal.

In the embodiment of the disclosure, the operation that the multiple filtered partial echo signals are synthesized to obtain the target echo signal of the target sub-swath further includes that the multiple filtered partial echo signals are summed in a time domain or a frequency domain to obtain the target echo signal of the target sub-swath.

In the technical solutions of the embodiments of the disclosure, the aliasing echo signals of the multiple sub-swaths are received; for the target sub-swath of the multiple sub-swaths, the multiple sub-beams associated with the target sub-swath are generated, the multiple sub-beams point to different directions of the target sub-swath respectively, and the null of each of the multiple sub-beams is used for deep nulling suppression on the echo signals of the sub-swaths except the target sub-swath; and the aliasing echo signals are processed based on the multiple sub-beams and the multiple nulls corresponding to the multiple sub-beams to generate the target echo signal of the target sub-swath. Therefore, pulse extension loss of an extracted echo of the sub-swath may be effectively compensated, a system signal-to-noise ratio is further increased, meanwhile, the echo interfering with the sub-swath may be effectively suppressed, and effective echo signal separation of the STWE SAR in elevation is implemented. Moreover, the technical solutions of the disclosure are favorable for reducing system complexity and high in practicability, and echo separation and Digital Beam Forming (DBF) synthesis processing may be implemented onboard in real time.

According to the technical solution of the embodiment of the disclosure, 1: the multipath beam former is used, the beam former may generate the multiple sub-beams, with different directions, of the target sub-swath by use of different weighting coefficients, and the sub-beams have the nulls of different directions, so that the pulse extension loss of the extracted echo of the sub-swath may be reduced, and meanwhile, deep nulling suppression on the whole pulse ground width within the other interference sub-swath may be implemented. 2: the narrow-band signal is extracted by use of the BPF, so that high-gain reception of part of a signal band of the sub-swath by each sub-beam may be implemented, and meanwhile, deep nulling and interference suppression of a signal in band corresponding to the interference sub-swath may be implemented. 3: the multiple filtered partial echo signals are synthesized to obtain a full-bandwidth signal, so that effective extraction of the echo signal of the target sub-swath is implemented.

Before 301 is executed, the following operation is further required to be executed: linear frequency modulation signals are transmitted in a time sharing manner to irradiate the multiple sub-swaths with the linear frequency modulation signals, irradiation time of the sub-swath far away from an SAR being earlier than irradiation time of the sub-swath close to the SAR.

In an alternative implementation of the disclosure, a transmitter of the SAR transmits the linear frequency modulation signals to irradiate the ground at a certain pulse repetition frequency. In a pulse repetition period, a phased array antenna irradiates the multiple sub-swaths in different beam directions in the time sharing manner. The sub-swath far away from the SAR is irradiated earlier than the sub-swath close to the SAR. By such a reasonable timing design, the echo of each sub-swath may overlap in the time domain, so that a length of an echo window is reduced, a system design is more flexible, and meanwhile, a data volume required to be sampled and stored onboard may be reduced.

Figure 5:
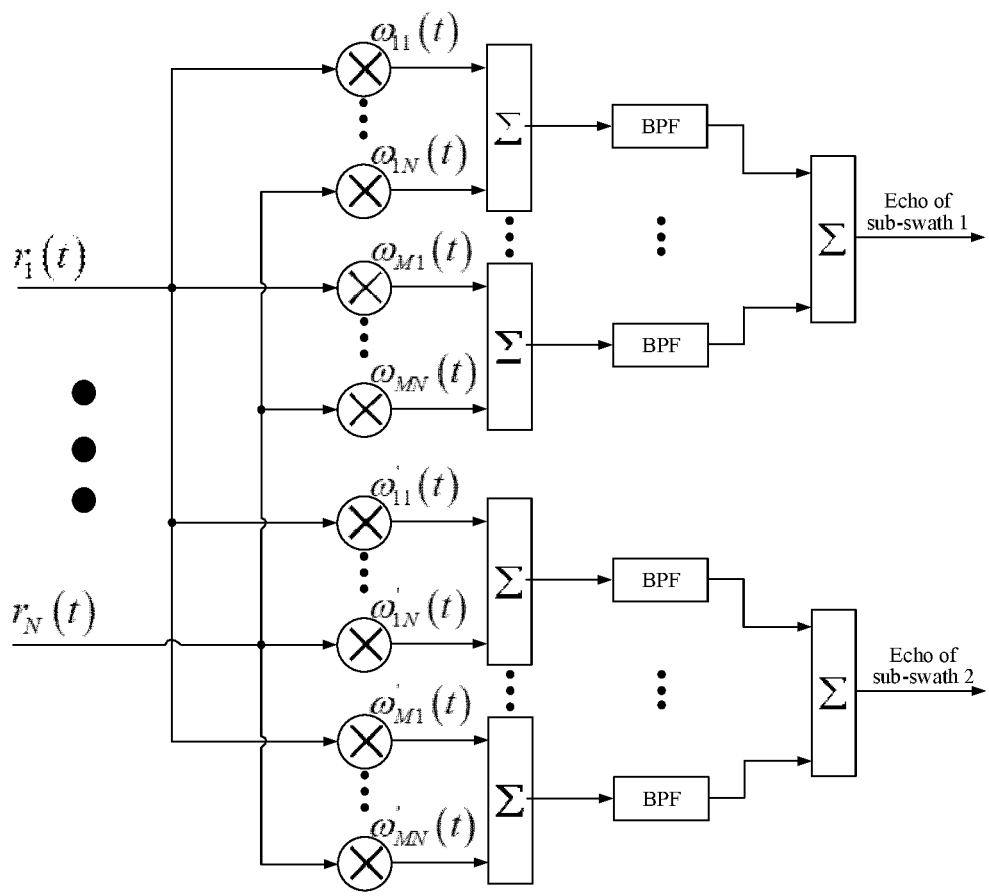
FIG. 5 is a processing flowchart of an implementation method of the technical solution of the embodiment of the disclosure.

FIG. 5 is a processing flowchart of an implementation method of the technical solution of the embodiment of the disclosure. In some embodiments, the echo signal of the sub-swath may be extracted according to the processing flowchart shown in FIG. 5. As shown in FIG. 5, $r_1(t), \ldots, r_N(t)$ is the aliasing echo signal received by the multichannel antenna in elevation; the multipath beam former with different weighting coefficients $\omega_{ij}(t)$ acts on the aliasing echo signals $r_1(t), \ldots, r_N(t)$ to generate the multiple sub-beams; the partial echo signals of the target sub-swaths are extracted from the aliasing echo signals by use of the sub-beams, then the extracted partial echo signals are filtered by use of the BPF to obtain the high-gain narrow-band signals corresponding to the sub-beams; and the multiple filtered partial echo signals are summed in the time domain or the frequency domain to obtain the target echo signals of the target sub-swaths: the echo of the sub-swath 1 and the echo of the sub-swath 2.

In an alternative implementation, the effects of the technical solution of the disclosure are presented with an X-band STWE SAR system in elevation, and are compared with processing results of a conventional LCMV method. System design parameters are shown in Table 1.

TABLE 1

| Parameter | Value |
| --- | --- |
| The number of channel in elevation | 16 |
| Channel spacing | 0.18 m |
| Carrier frequency | 9.6 GHz |
| Orbit height | 700 km |
| Signal bandwidth | 500 MHz |
| Sampling rate | 600 MHz |
| Pulse width | 60 μs |
| Sub-beam former number | 13 |

Figure 1:
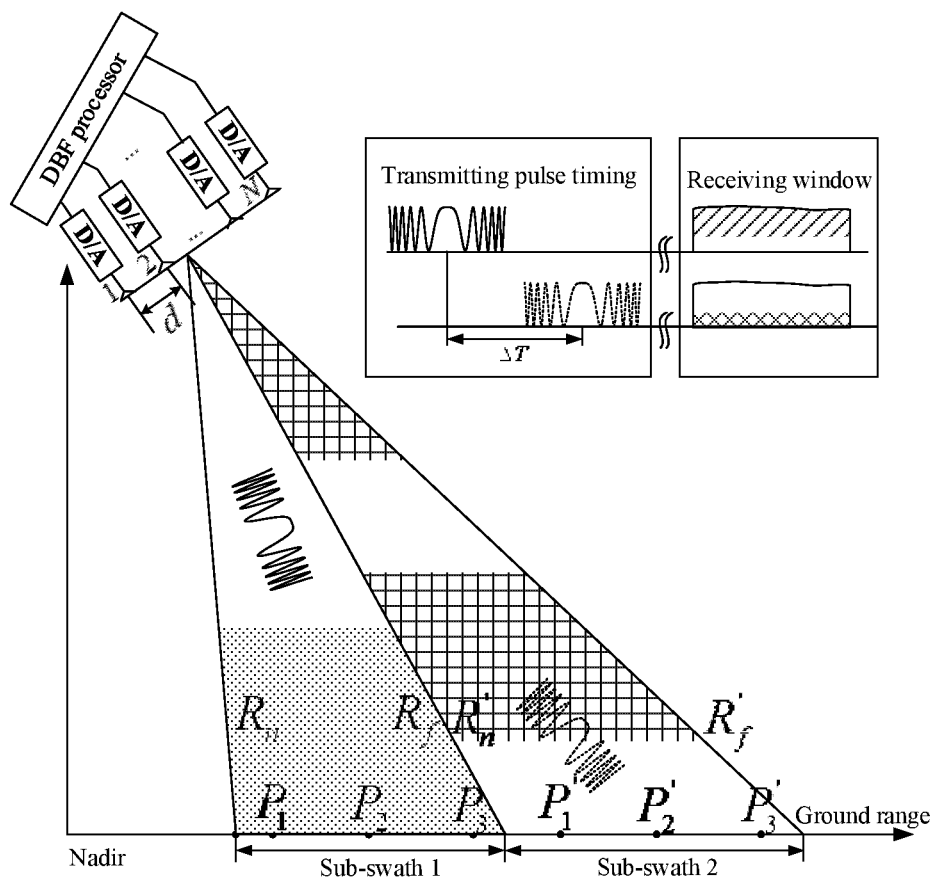
FIG. 1 is a schematic diagram of a working principle of an STWE SAR in elevation (for example, for two sub-swaths).
Figure 6:
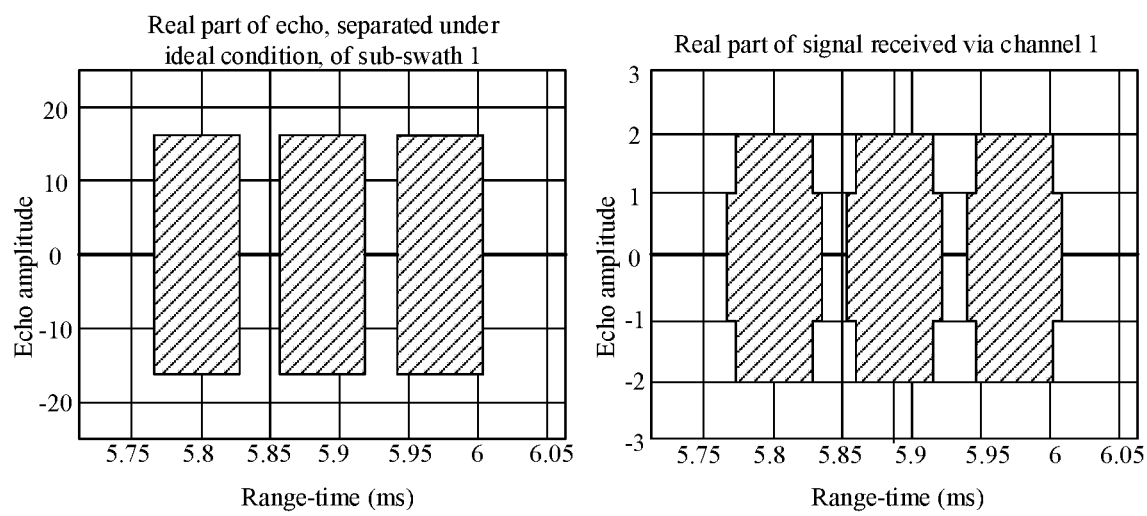
FIG. 6 is a schematic diagram of a real part of an echo signal, separated under an ideal condition, of a sub-swath 1 and a real part of an echo signal received through a channel 1.

For example, for two sub-swaths in elevation, each sub-swath simulates three point targets, the point targets of the sub-swath 1 are $P_1$, $P_2$ and $P_3$, and the point targets of the sub-swath 2 are $P_1'$, $P_2'$ and $P_3'$. A point target placement condition is shown in FIG. 1. The corresponding point targets have aliasing echoes. Echo generation is performed according to a geometric signal receiving relationship in FIGS. 1, and 16 paths of generated baseband signals are stored for subsequent processing respectively. FIG. 6 is a schematic diagram of a real part of an echo signal, separated under an ideal condition, of a sub-swath 1, and a real part of an echo signal received via a channel 1. The left figure shows the real part of the echo signal, separated under the ideal condition, of the sub-swath 1, and based on it, performance of the method is evaluated with extracting the echo of the sub-swath 1 and suppressing the echo of the sub-swath 2 as an example. The right figure in FIG. 6 shows the real part of the echo signal received via the channel 1, and illustrates a temporal aliasing condition of the echoes received via each channel from the two sub-swaths.

Figure 7:
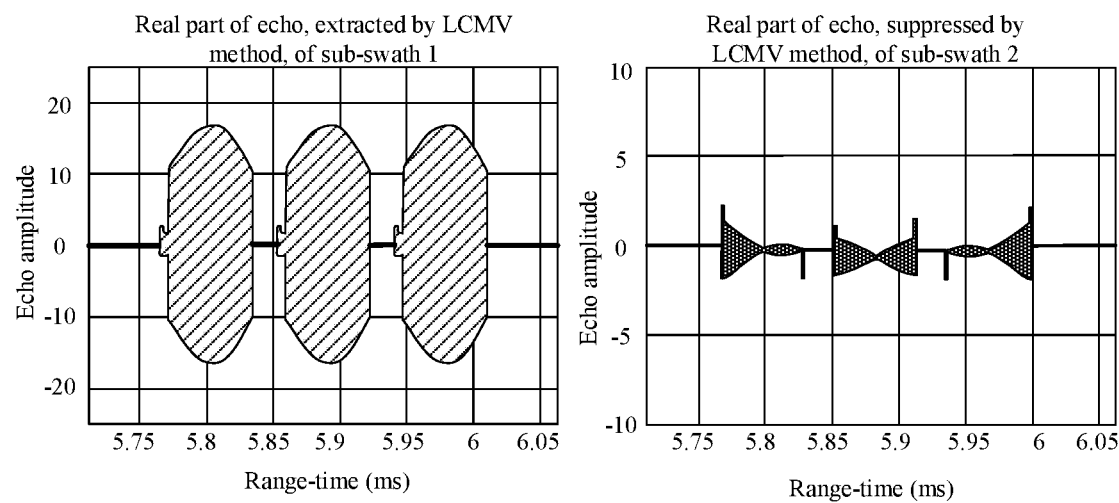
FIG. 7 is a schematic diagram of a real part of an echo signal, extracted by a Linear Constraint Minimum Variance (LCMV) method, of a sub-swath 1 and a real part of an echo signal, suppressed by the LCMV method, of a sub-swath 2.

FIG. 7 is a schematic diagram of a real part of an echo signal, extracted by an LCMV method, of a sub-swath 1 and a real part of an echo signal, suppressed by the LCMV method, of a sub-swath 2. As shown in the left figure in FIG. 7, an amplitude of the real part of the echo signal, extracted by the LCMV method, of the sub-swath 1 is obviously modulated, which is caused by extension loss of pulse received by DBF. As shown in the right figure in FIG. 7, the real part of the echo signal, suppressed by the LCMV method, of the sub-swath 2 greatly remains. Due to an extension characteristic of a pulse in the sub-swath 2, an LCMV beam former may only form a deepest null in a center of an echo signal of each point target of the sub-swath 2 and may not reach a sufficient nulling depth at another position, which causes a certain residue of the echo signal of the sub-swath 2.

Figure 8:
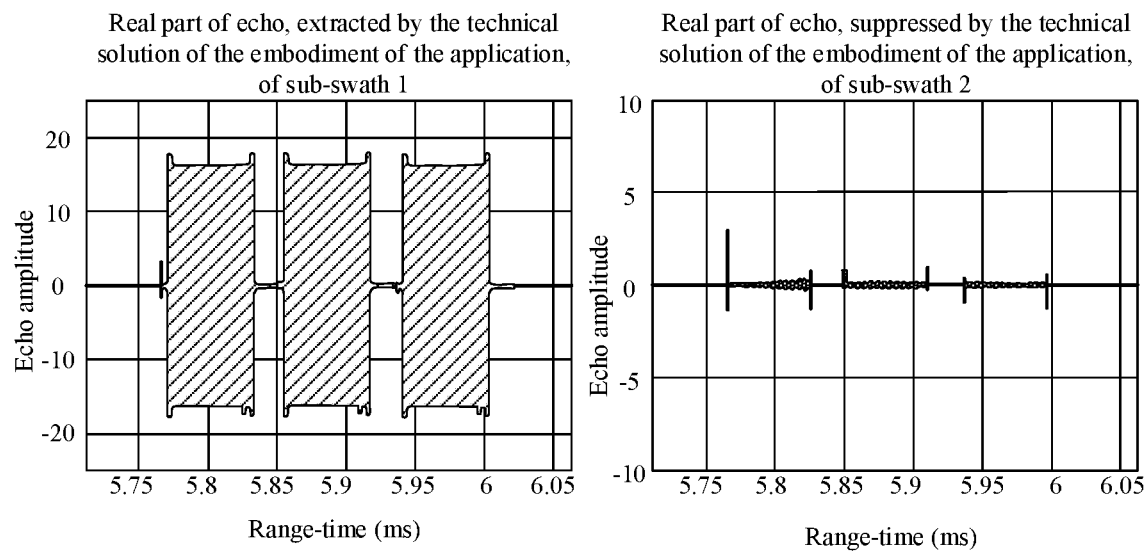
FIG. 8 is a schematic diagram of a real part of an echo signal, extracted by the technical solution of the embodiment of the disclosure, of a sub-swath 1 and a real part of an echo signal, suppressed by the technical solution of the embodiment of the disclosure, of a sub-swath 2.

FIG. 8 is a schematic diagram of a real part of an echo signal, extracted by the technical solution of the embodiment of the disclosure, of a sub-swath 1 and a real part of an echo signal, suppressed by the technical solution of the embodiment of the disclosure, of a sub-swath 2. As shown in FIG. 8, an amplitude of the real part, shown in the left figure, of the extracted echo signal of the sub-swath 1 is not obviously modulated, and the influence of the pulse extension loss is substantially eliminated. Relatively deep nulling of the echo signal, shown in the right figure, of the sub-swath 2 during the whole echo time of each point target is ensured, and an echo signal residue, compared with that formed when the LCMV beam former is used, is greatly reduced.

For quantitatively evaluating the advantages of the technical solution of the embodiment of the disclosure relative to the conventional method, pulse compression is performed on the signal, suppressed by the two methods, of the sub-swath 2, normalization is performed with reference to a maximum value of signal pulse compression results, and statistical pulse compression peaks of each suppressed point target of the sub-swath 2 are shown in Table 2.

TABLE 2

| Serial number of interference point target | $P'_1$ | $P'_2$ | $P'_3$ |
| --- | --- | --- | --- |
| LCMV beam former | −33.7 dB | −30.7 dB | −39.4 dB |
| Technical solution of the application | −58.0 dB | −56.4 dB | −61.8 dB |

By comparison, it can be seen that, compared with the LCMV beam former, suppression on the interference signal in the technical solution of the application is averagely improved by about 24 dB. According to the technical solution of the application, echo signal separation of the STWE SAR in elevation may be implemented well.

The technical solution of the embodiment of the application is mainly applied to the method for separating echo signals of the STWE SAR in elevation, but the technical solution of the embodiment of the application may also be applied to echo signal separation of an azimuth STWE SAR, not limited to the STWE SAR in elevation.

Figure 9:
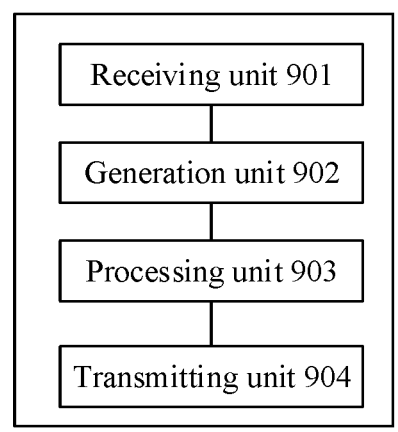
FIG. 9 is a structure diagram of a device for separating echo signals of STWE SAR in elevation according to an embodiment of the disclosure.

An embodiment of the disclosure provides a device for separating echo signals of STWE SAR in elevation. FIG. 9 is a structure diagram of a device for separating echo signals of STWE SAR in elevation according to an embodiment of the disclosure. As shown in FIG. 9, the device 900 includes a receiving unit 901, a generation unit 902 and a processing unit 903.

The receiving unit 901 is configured to receive aliasing echo signals of multiple sub-swaths.

The generation unit 902 is configured to, for a target sub-swath of the multiple sub-swaths, generate multiple sub-beams associated with the target sub-swath, the multiple sub-beams pointing to different directions of the target sub-swath respectively, and a null of each of the multiple sub-beams being configured for deep nulling suppression on echo signals of sub-swaths except the target sub-swath.

The processing unit 903 is configured to process the aliasing echo signals based on the multiple sub-beams and multiple nulls corresponding to the multiple sub-beams to generate a target echo signal of the target sub-swath.

In an implementation of the disclosure, the device further includes a transmitting unit 904, configured to, before the receiving unit receives the aliasing echo signals of the multiple sub-swaths, transmit linear frequency modulation signals in a time sharing manner to irradiate the multiple sub-swaths with the linear frequency modulation signals, irradiation time of the sub-swath far away from the SAR being earlier than irradiation time of the sub-swath close to the SAR.

In an implementation of the disclosure, the processing unit 903 is configured to, for each of the multiple sub-beams, extract a partial echo signal of the target sub-swath from the aliasing echo signals by use of the sub-beam, perform deep nulling suppression on the echo signals of the sub-swaths except the target sub-swath by use of the null of the sub-beam, extract multiple partial echo signals of the target sub-swath from the aliasing echo signals by use of the multiple sub-beams, filter the multiple partial echo signals and synthesize the multiple filtered partial echo signals to obtain the target echo signal of the target sub-swath.

In an implementation of the disclosure, an i th path in a multipath beam former is used to extract the partial echo signal of the target sub-swath, and a weighted vector for deep nulling suppression on the echo signals of the sub-swaths except the target sub-swath is:

$$\omega_{im}^H = N \cdot e_m^T (V_i^H V_i)^{-1} \cdot V_i^H,$$

where $$i = -\frac{M-1}{2}, -\frac{M-1}{2}+1, \ldots + \frac{M-1}{2},$$

i is a serial number of the sub-beam, the minus represents that the sub-beam is on a left side of a central sub-beam, the plus represents that the sub-beam is on a right side of the central sub-beam, M is the number of the multiple sub-beams, $e_m$ is a column vector that is 1 for an m th element and 0 for others, and $V_i$ is a receiving array multi-matrix of the i th sub-beam.

In an implementation of the disclosure, for a partial echo signal corresponding to the i th sub-beam, the partial echo signal is filtered according to the following band range of:

$$\left[-\frac{2 \cdot i + 1}{2 \cdot M} \cdot B_r, -\frac{2 \cdot i - 1}{2 \cdot M} \cdot B_r\right],$$

where $B_r$ is a bandwidth for transmitting signals, and M is the number of the multiple sub-beams.

In an implementation of the disclosure, an angle between two adjacent sub-beams. of the multiple sub-beams is $$\Delta \partial_m(t) = \frac{\partial_m(t)}{M},$$

where $\partial_m(t)$ is a pulse downward viewing angle width of the target sub-swath, and M is the number of the multiple sub-beams.

In an implementation of the disclosure, the multiple sub-beams correspond to the multiple nulls, and an angle between two adjacent nulls of the multiple nulls is $$\Delta \partial_n(t) = \frac{\partial_n(t)}{M},$$

where $\partial_n(t)$ is a pulse downward viewing angle width of the sub-swaths except the target sub-swath, and M is the number of the multiple sub-beams.

In an implementation of the disclosure, the processing unit 903 is configured to synthesize the multiple filtered partial echo signals in a time domain or a frequency domain to obtain the target echo signal of the target sub-swath.

It is to be pointed out that descriptions about the above embodiment of the device for separating echo signals of the STWE SAR in elevation are similar to descriptions about the method embodiment, beneficial effects similar to those of the method embodiment are achieved and thus elaborations are omitted. Undisclosed technical details in the embodiment of the device for separating echo signals of the STWE SAR in elevation in the application are understood with reference to the descriptions about the method embodiment of the disclosure. For saving the space, elaborations are omitted.

It is to be understood that "one embodiment" and "an embodiment" mentioned in the whole specification mean that specific features, structures or characteristics related 0to the embodiment is included in at least one embodiment of the disclosure. Therefore, "in one embodiment" or "in an embodiment" appearing at any place of the whole specification does not always refer to the same embodiment. In addition, these specific features, structures or characteristics may be combined in one or more embodiments in any proper manner. It is to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure. The sequence numbers of the embodiments of the disclosure are adopted not to represent superiority-inferiority of the embodiments but only for description.

It is to be noted that terms "include" and "contain" in the invention or any other variant thereof is intended to cover nonexclusive inclusions, so that a process, method, object or device including a series of elements not only includes those elements but also includes other elements which are not clearly listed or further includes elements intrinsic to the process, the method, the object or the device. Under the condition of no more limitations, an element defined by the statement "including a/an . . . " does not exclude existence of the same other elements in a process, method, object or device including the element.

In some embodiments provided by the disclosure, it is to be understood that the disclosed device and method may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each functional unit in each embodiment of the disclosure may be integrated into a processing unit, each unit may also serve as an independent unit and two or more than two units may also be integrated into a unit. The integrated unit may be implemented in a hardware form and may also be implemented in form of hardware and software functional unit.

Those of ordinary skill in the art should know that all or part of the steps of the method embodiment may be implemented by related hardware instructed through a program, the program may be stored in a computer-readable storage medium, and the program is executed to execute the steps of the method embodiment. The storage medium includes: various media capable of storing program codes such as a mobile storage device, a Read Only Memory (ROM), a magnetic disk or a compact disc.

Or, when being implemented in form of software functional module and sold or used as an independent product, the integrated unit of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a mobile hard disk, a ROM, a magnetic disk or a compact disc.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for separating echo signals of Space-Time Waveform Encoding Synthetic Aperture Radar (STWE SAR) in elevation, comprising:
receiving aliasing echo signals of a plurality of sub-swaths;
for a target sub-swath of the plurality of sub-swaths, generating a plurality of sub-beams associated with the target sub-swath, the plurality of sub-beams pointing to different directions of the target sub-swath respectively, and a null of each of the plurality of sub-beams being used for deep nulling suppression on echo signals of sub-swaths except the target sub-swath; and
processing the aliasing echo signals based on the plurality of sub-beams and a plurality of nulls corresponding to the plurality of sub-beams to generate a target echo signal of the target sub-swath;
wherein processing the aliasing echo signals based on the plurality of sub-beams and the plurality of nulls corresponding to the plurality of sub-beams to generate the target echo signal of the target sub-swath comprises:
for each of the plurality of sub-beams, extracting a partial echo signals of the target sub-swath from the aliasing echo signals by use of the sub-beams, and performing deep nulling suppression on the echo signals of the sub-swaths excepts the target sub-swath by use of the null of the sub-beam;
extracting a plurality of partial echo signals of the target sub-swath from the aliasing echo signals by use of the plurality of sub-beams; and
filtering the plurality of partial echo signals, and synthesizing the plurality of filtered partial echo signals to obtain the target echo signal of the target sub-swath.

2. The method of claim 1, before receiving the aliasing echo signals of the plurality of sub-swaths, further comprising:
transmitting linear frequency modulation signals in a time sharing manner to irradiate the plurality of sub-swaths with the linear frequency modulation signals, irradiation time of sub-swaths far away from an SAR being earlier than irradiation time of sub-swaths close to the SAR. of filtered partial echo signals to obtain the target echo signal of the target sub-swath.

3. The method of claim 1, wherein the plurality of sub-beams are generated by a multipath beam former, an i th path in the multipath beam former being used to extract the partial echo signal of the target sub-swath, and a weighted vector for deep nulling suppression on the echo signals of the sub-swaths except the target sub-swath is:

$$\omega_{im}^H = N \cdot e_m^T (V_i^H V_i)^{-1} \cdot V_i^H,$$

where $$i = -\frac{M-1}{2}, -\frac{M-1}{2}+1, \ldots +\frac{M-1}{2},$$

i is a serial number of the sub-beam, a minus represents that the sub-beam is on a left side of a central sub-beam, a plus represents that the sub-beam is on a right side of the central sub-beam, M is a number of the plurality of sub-beams, $e_m$ is a column vector that is 1 for an m th element and 0 for others, and $V_i$ is a receiving array multi-matrix of an i th sub-beam.

4. The method of claim 1, wherein, for a partial echo signal corresponding to the i th sub-beam, the partial echo signal corresponding to the i th sub-beam is filtered according to band range of:

$$\left[ -\frac{2 \cdot i + 1}{2 \cdot M} \cdot B_r, -\frac{2 \cdot i - 1}{2 \cdot M} \cdot B_r \right],$$

where $B_r$ is a bandwidth for transmitting signals, and M is a number of the plurality of sub-beams.

5. The method of claim 1, wherein an angle between centers of two adjacent sub-beams of the plurality of sub-beams is $$\Delta \vartheta_m(t) = \frac{\vartheta_m(t)}{M},$$

where $\vartheta_m(t)$ is a pulse downward viewing angle width of the target sub-swath, and M is a number of the plurality of sub-beams.

6. The method of claim 1, wherein each sub-beams of the plurality of sub-beams corresponds to each null of the plurality of nulls, and an angle between two adjacent nulls of the plurality of nulls is $$\Delta \vartheta_n(t) = \frac{\vartheta_n(t)}{M},$$

where $\vartheta_n(t)$ is a pulse downward viewing angle width of the sub-swaths except the target sub-swath, and M is a number of the plurality of sub-beams.

7. The method of claim 1, wherein synthesizing the plurality of filtered partial echo signals to obtain the target echo signal of the target sub-swath comprises:
summing the plurality of filtered partial echo signals in a time domain or a frequency domain to obtain the target echo signal of the target sub-swath.

8. The method of claim 1, wherein the receiving aliasing echo signals of a plurality of sub-swaths comprises:
receiving the aliasing echo signals of the plurality of sub-swaths via a multichannel antenna.

9. A device for separating echo signals of Space-Time Waveform Encoding Synthetic Aperture Radar (STWE SAR) in elevation, comprising:
a processor; and
memory storing instructions for execution by the processor, wherein the processor is configured to:
receive aliasing echo signals of a plurality of sub-swaths;
for a target sub-swath of the plurality of sub-swaths, generate a plurality of sub-beams associated with the target sub-swath, the plurality of sub-beams pointing to different directions of the target sub-swath respectively, and a null of each of the plurality of sub-beams being used for deep nulling suppression on echo signals of sub-swaths except the target sub-swath; and
process the aliasing echo signals based on the plurality of sub-beams and a plurality of nulls corresponding to the plurality of sub-beams to generate a target echo signal of the target sub-swath;
wherein the processor is further configured to for each of the plurality of sub-beams, extract a partial echo signal of the target sub-swath from the aliasing echo signals by use of the sub-beam, perform deep nulling suppression on the echo signals of the sub-swaths except the target sub-swath by use of the null of the sub-beam, extract a plurality of partial echo signals of the target sub-swath from the aliasing echo signals by use of the plurality of sub-beams, filter the plurality of partial echo signals and synthesize the plurality of filtered partial echo signals to obtain the target echo signal of the target sub-swath.

10. The device of claim 9, wherein the processor is further configured to:
before the receiving unit receives the aliasing echo signals of the plurality of sub-swaths, transmit linear frequency modulation signals in a time sharing manner to irradiate the plurality of sub-swaths with the linear frequency modulation signals, irradiation time of the sub-swaths far away from an SAR being earlier than irradiation time of the sub-swaths close to the SAR.

11. The device of claim 9, wherein an i th path in a multipath beam former is used to extract the partial echo signal of the target sub-swath, and a weighted vector for deep nulling suppression on the echo signals of the sub-swaths except the target sub-swath is:

$$\omega_m^H = N \cdot e_m^T (V_i^H V_i)^{31\ 1} \cdot V_i^H,$$

where $$i = -\frac{M-1}{2}, -\frac{M-1}{2}+1, \ldots +\frac{M-1}{2},$$

i is a serial number of the sub-beam, a minus represents that the sub-beam is on a left side of a central sub-beam, a plus represents that the sub-beam is on a right side of the central sub-beam, M is a number of the plurality of sub-beams, $e_m$ is a column vector that is 1 for an m th element and 0 for others, and $V_i$ is a receiving array multi-matrix of an i th sub-beam.

12. The device of claim 9, wherein, for a partial echo signal corresponding to the i th sub-beam, the partial echo signal corresponding to the i th sub-beam is filtered according to the band range of:

$$\left[-\frac{2 \cdot i+1}{2 \cdot M} \cdot B_r, -\frac{2 \cdot i-1}{2 \cdot M} \cdot B_r\right],$$

where $B_r$ is a bandwidth for transmitting signals, and M is a number of the plurality of sub-beams.

13. The device of claim 9, wherein an angle between centers of two adjacent sub-beams of the plurality of sub-beams is $$\Delta\partial_m(t) = \frac{\partial_m(t)}{M},$$

where $\partial_m$ (t) is a pulse downward viewing angle width of the target sub-swath, and M is a number of the plurality of sub-beams.

14. The device of 9 10, wherein each sub-beam of the plurality of sub-beams corresponds to each null of the plurality of nulls, and an angle between two adjacent nulls of the plurality of nulls is $$\Delta\partial_n(t) = \frac{\partial_n(t)}{M},$$

where $\partial_n$ (t) is a pulse downward viewing angle width of the sub-swaths except the target sub-swath, and M is a number of the plurality of sub-beams.

15. The device of claim 9, wherein the processor is further configured to sum the plurality of filtered partial echo signals in a time domain or a frequency domain to obtain the target echo signal of the target sub-swath.

16. The device of claim 9, wherein the processor is further configured to receive the aliasing echo signals of the plurality of sub-swaths via a multichannel antenna.

17. A non-transitory computer-readable storage medium having stored therein computer instructions that when executed by a processor, implement the steps of the method for separating echo signals of Space-Time Waveform Encoding Synthetic Aperture Radar (STWE SAR) in an elevation, wherein the method comprises:
receiving aliasing echo signals of a plurality of sub-swaths;
for a target sub-swath of the plurality of sub-swaths, generating a plurality of sub-beams associated with the target sub-swath, the plurality of sub-beams pointing to different directions of the target sub-swath respectively, and a null of each of the plurality of sub-beams being used for deep nulling suppression on echo signals of sub-swaths except the target sub-swath; and
processing the aliasing echo signals based on the plurality of sub-beams and a plurality of nulls corresponding to the plurality of sub-beams to generate a target echo signal of the target sub-swath;
wherein processing the aliasing echo signals based on the plurality of sub-beams and the plurality of nulls corresponding to the plurality of sub-beams to generate the target echo signal of the target sub-swath comprises:
for each of the plurality of sub-beams, extracting a partial echo signal of the target sub-swath from the aliasing echo signals by use of the sub-beam, and performing deep nulling suppression on the echo signals of the sub-swaths except the target sub-swath by use of the null of the sub-beam;
extracting a plurality of partial echo signals of the target sub-swath from the aliasing echo signals by use of the plurality of sub-beams; and
filtering the plurality of partial echo signals, and synthesizing the plurality of filtered partial echo signals to obtain the target echo signal of the target sub-swath.

* * * * *